United States Patent [19]
Saito

[11] Patent Number: 5,699,766
[45] Date of Patent: Dec. 23, 1997

[54] FUEL INJECTION SYSTEM FOR ENGINE

[75] Inventor: Chitoshi Saito, Hamamatsu, Japan

[73] Assignee: Sanshin Kogyo Kabushiki Kaisha, Shizuoka, Japan

[21] Appl. No.: 608,556

[22] Filed: Feb. 28, 1996

[30] Foreign Application Priority Data

Feb. 28, 1995 [JP] Japan ................................. 7-040412

[51] Int. Cl.$^6$ ........................... F02B 19/10; F02D 41/34
[52] U.S. Cl. ......................... 123/257; 123/276; 123/305; 123/73 C
[58] Field of Search ........................ 123/257, 276, 123/478, 339.11, 294, 305, 73 C

[56] References Cited

U.S. PATENT DOCUMENTS

| | | | |
|---|---|---|---|
| 3,937,188 | 2/1976 | Wrigley | 123/276 |
| 5,209,200 | 5/1993 | Ahern et al. | 123/276 |
| 5,280,772 | 1/1994 | Weber et al. | 123/339.11 |
| 5,450,828 | 9/1995 | Sakamoto et al. | 123/339.11 |
| 5,579,736 | 12/1996 | Nakamura et al. | 123/339.11 |

*Primary Examiner*—Willis R. Wolfe
*Attorney, Agent, or Firm*—Knobbe, Martens, Olson & Bear, LLP

[57] ABSTRACT

A two-cycle, direct injection, internal combustion engine provides improved performance by using a portion of energy produced by the production process to heat the engine. The engine includes a plurality of direct fuel injected cylinders and a fuel injection control system. The control system includes a sensory system which detects several operating parameters of the engine, such as, engine speed and intake air flow. An electronic control unit receives input signals from the sensory system and determines the operational condition of the engine. Based on the determined operational condition of the engine, the electronic control unit controls throttle opening degree, fuel injection amounts and timing, and ignition timing. At operating conditions below a preselected engine speed/load condition, the electronic control unit maintains a generally constant throttle opening and fuel injection amount to produce a desired air/fuel ratio. The electronic control unit controls engine speed by retarding ignition until after a minimum volume condition within the respective combustion chamber has occurred.

18 Claims, 7 Drawing Sheets

FUEL INJECTION SYSTEM FOR ENGINE

BACKGROUND OF THE INVENTION

1. Field of the Invention

The present invention relates in general to an internal combustion engine. In particular, the present invention relates to a fuel injection system for an engine.

2. Description of Related Art

Direct cylinder fuel injection is known to increase fuel economy and to improve exhaust emission control. Direct fuel injection provides these advantages by stratifying the fuel-air charge to position the stoichiometric fuel patch about the spark gap at ignition.

Prior direct injection, two-cycle, crankcase-compression, internal combustion engines operate on a conventional scavenging principle. Scavenging involves simultaneous exhausting burned gases from a variable volume combustion chamber while delivering fresh air into the chamber. Ideally, the crankcase-compressed fresh air solely displaces the exhaust gases; however, in practice, a portion of the scavenge flow (i.e., a blow-by portion) into the chamber passes through the exhaust port with the exhaust gases. This phenomenon tends to create problems for direct injection of fuel into the combustion chamber.

A fuel injector commonly injects fuel into the combustion chamber to form the fuel-air charge. If the fuel injector injects fuel into the combustion chamber before the exhaust port is closed, the blow-by portion of the scavenge flow tends to entrain a portion of the fuel and carries the fuel through the exhaust port. Conventional direct injection, two-cycle engines consequently inject fuel into the combustion chamber after the exhaust port closes.

The delayed fuel injection, however, provides little time for fuel atomization before ignition. The delay consequently results in an inconsistent fuel-air mixture.

Some prior direct injection two-cycle engines compensate for the delayed in fuel injection by maximizing the atomization angle of the fuel injector to increase fuel atomization. That is, more fuel atomizes and becomes gaseous with a larger injector spray angle. A wider atomization angle thus produces a more homogeneous fuel-air mixture throughout the combustion chamber. However, stratification of the fuel-air charge, as well as the above-noted associated advantages, are lost.

Conventional direct injection engine also control the fuel injectors to produce a desired fuel-air ratio depending upon the speed and load condition of the engine. For this purpose, many prior engines detect intake air flow into the engine and operate the fuel injectors to inject a corresponding amount of fuel. However, under low speed, low load operational periods, when the throttle valve lies substantially closed, conventional flow sensors tend to imprecisely measure air intake flow. The computed fuel amount often varies form the target fuel-air ratio, producing inconsistent engine speed due to fluctuated combustion.

SUMMARY OF THE INVENTION

On aspect of the present invention involves an internal combustion engine comprising an engine speed control operator. The operator is movable within a range of movement such that the position of the engine control operator corresponds to a desired engine speed. At least one variable volume chamber of the engine is defined by first and second components which move relative to each other. A throttle device communicates with the chamber to regulate intake air flow into the chamber. A throttle actuator is arranged to vary the opening degree of the throttle device and the throttle actuator cooperates with the engine control operator. A fuel injector is mounted in the first component and is arranged to deliver fuel directly into the chamber to form a fuel-air charge. An igniter is positioned within the chamber to ignite the fuel-air charge. A speed sensor detects the speed of the engine and an intake air sensor detects the amount of intake air flow into the chamber. And an operator position sensor detects the position of the engine control operator. A controller communicates with the sensors and responds to the input signals from the sensors to ascertain the operating condition of the engine. The controller also determines whether the operating condition is below a preselected operating condition. The controller is further configured to control the throttle actuator to maintain a substantially constant opening degree with the engine operating below the preselected operating condition, to control the fuel injector to maintain a substantially constant amount of fuel injected into the chamber with the engine operating below the preselected operating condition, and to adjust igniting timing of the igniter to provide engine speed corresponding to the position of the engine control operator.

In accordance with another aspect of the present invention, an internal combustion engine is provided. The engine includes at least one variable volume chamber defined by first and second components which move relative to each other. A fuel injector is mounted in the first component and is arranged to spray fuel into the chamber toward the second component. A sensory system detects engine speed and air intake amounts into the chamber and communicates this information to a controller. The controller responds to at least one input signal from the sensor system to determine the operational condition of the engine. The controller is also configured to determined if the determined operational condition is within a preselected range of low speed, low load operational conditions and to control the fuel injector to maintain a substantially constant amount of fuel injected into the chamber to meet a preselected fuel-air ratio with the engine condition operating within the range of low speed/low load operating conditions.

Another aspect of the present invention involves an internal combustion engine comprising at least one variable volume chamber. The chamber is defined by first and second components which move relative to each other. A fuel injector is mounted in the first component and is arranged to spray fuel into the chamber toward the second component. A throttle actuator actuates a throttle device which communicates with the chamber. The throttle actuator varies an opening degree of the throttle in a manner generally corresponding to a operational position of a throttle operator. The engine also includes means for sensing low speed/low load operational condition of the engine, and means for maintaining a constant opening degree of the throttle device with the engine operating under a low speed/low load operational condition. Means are also provided for maintaining a generally constant fuel amount injected by the fuel injector to produce a preselected fuel-air ratio, and for controlling ignition timing so as to provide engine speed corresponding to the operational position of the throttle operator.

A method of controlling engine operation involves sensing the operational condition of the engine and determining if the sensed operation conditions is within a preselected range of low engine speed/low load operational conditions. A substantially constant opening degree of the throttle device is maintained while the sensed operational condition is within the preselected range. A substantially constant amount of fuel injected by the injector into the chamber also is maintained to produce a fuel-air charge which meets a preselected air-fuel ratio while the sensed operational condition of the engine is within the preselected range. And ignition of the charge is timed to provide an engine speed corresponding to the operational position of the throttle operator.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
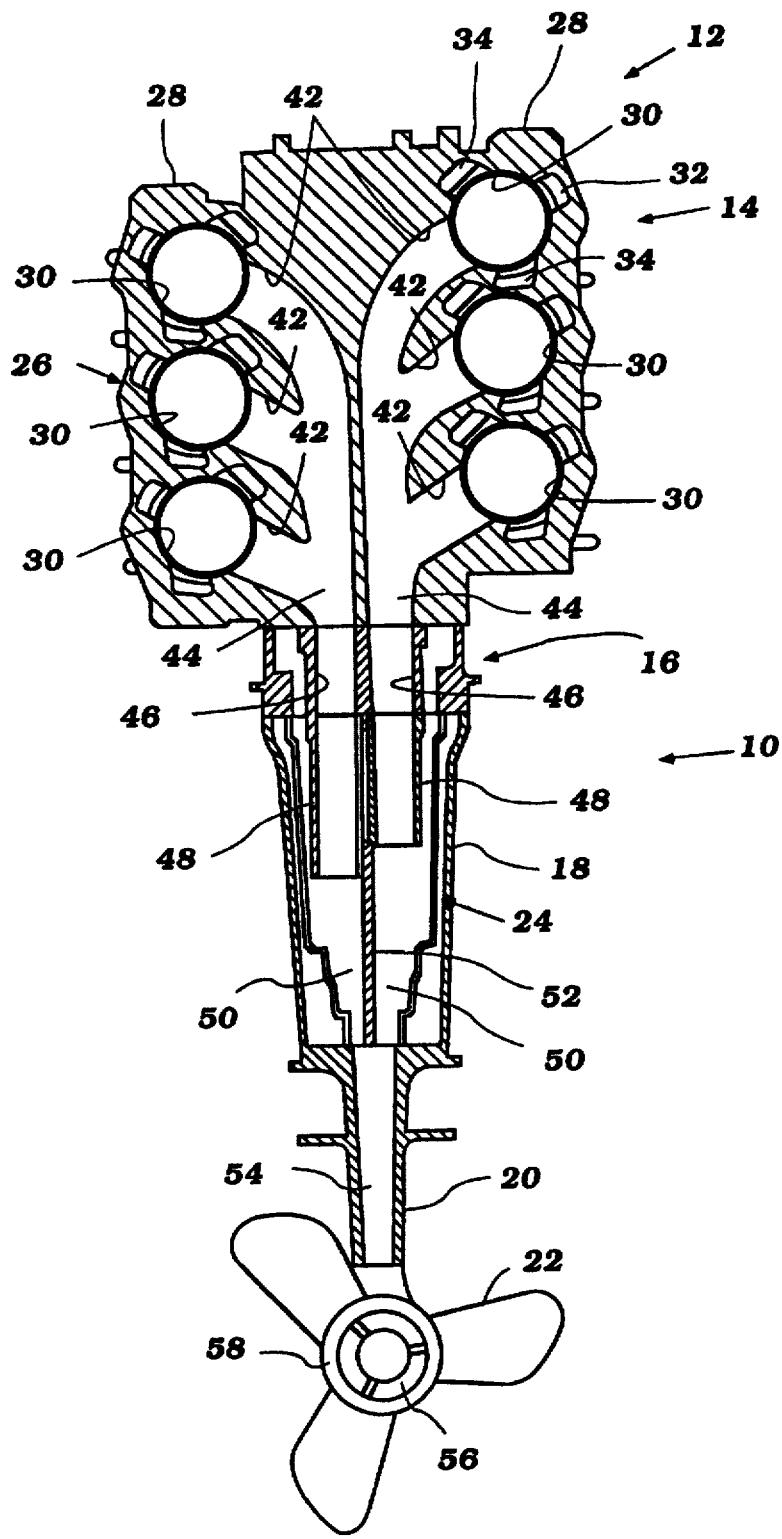
FIG. 1 is a rear elevational cross-sectional view of a marine drive incorporating an engine configured in accordance with a preferred embodiment of the present invention.

FIG. 1 illustrates a marine drive 10 of the type in which the present fuel injection system can be incorporated. The present fuel injection system has particular utility with marine drives employing two-cycle, crankcase compression, V-type internal combustion engines as the power unit. Because outboard motors commonly employ such engines, the fuel injection system is being described in connection with an outboard motor; however, the depiction of the invention in conjunction with an outboard motor is merely exemplary. Those skilled in the art will readily appreciate that the present fuel injection system can be applied to an inboard motor of an inboard/outboard drive, to an inboard motor of a personal watercraft, and to other types of watercraft engines as well.

In the illustrated embodiment, the outboard drive 10 includes a power head 12 formed in part by an engine 14. A conventional cowling (not shown) desirably surrounds the engine 14, as known in the art.

The engine 14 is mounted to a support plate 16. The orientation of the engine 14 on the support plate 16 positions a crankshaft 17 (FIG. 5) to rotate about a generally vertical axis. The crankshaft 17 drives a drive shaft (not shown) which depends from the power head 12 of the outboard drive 10 and extends through and is journaled within a drive shaft housing 18. The drive shaft depends downwardly into a lower unit 20 where it drives a transmission (not shown).

The transmission is configured to selectively establish a drive condition of a propulsion device 22, such as, for example, a propeller. The transmission desirably is a forward/neutral/reverse type transmission. In this manner, the propulsion device 22 can drive the watercraft in any of these operational states.

As seen in FIG. 1, the drive shaft housing 18 extends downwardly from the support plate 16 and terminates in the lower unit 22. The drive shaft housing 18 houses a muffler 24 that communicate with an exhaust system of the engine 14, as described below.

Figure 2:
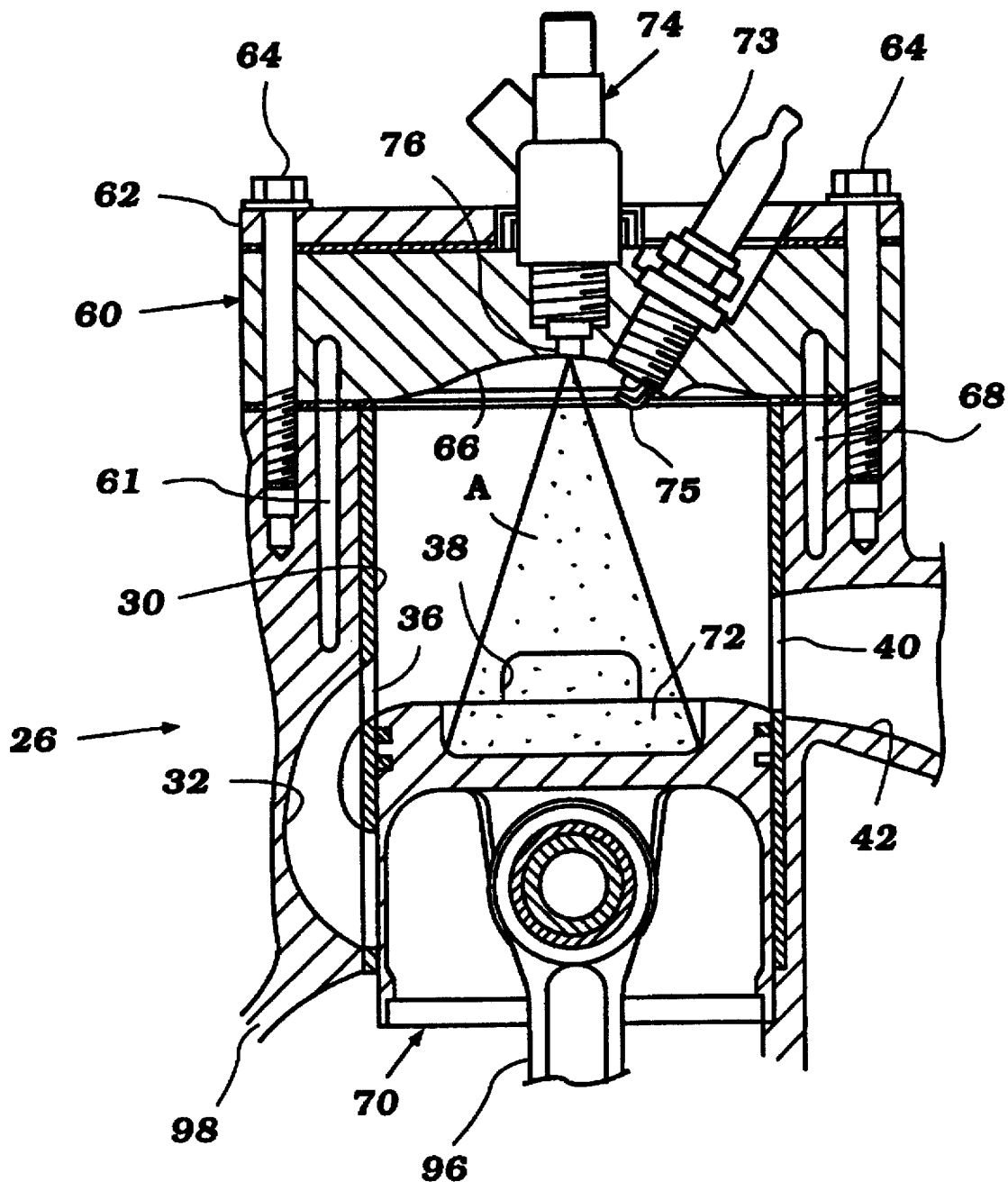
FIG. 2 is a partial, plan cross-sectional view of a cylinder assembly of the engine of FIG. 1.
Figure 3:
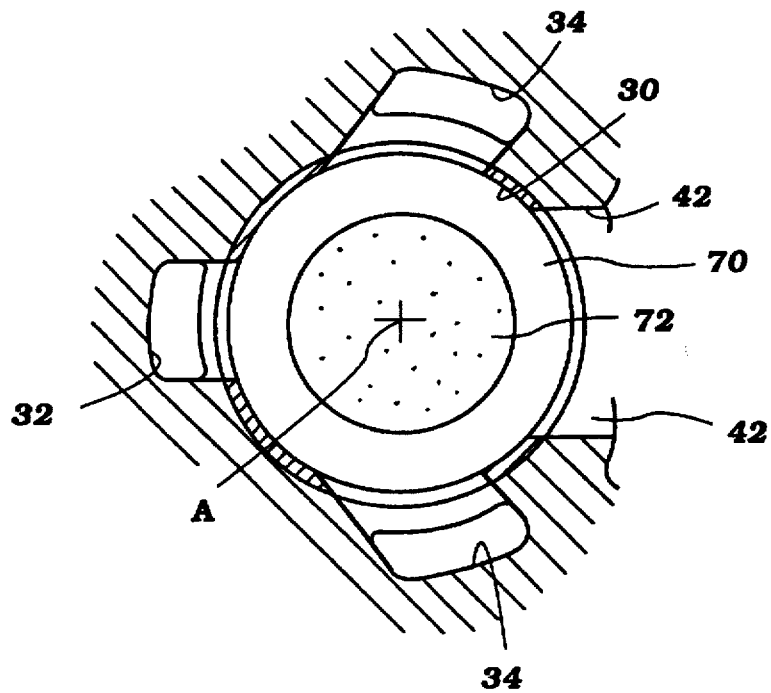
FIG. 3 is a cross-sectional view of the cylinder assembly taken along line 3—3 of FIG. 2.

With reference to FIGS. 1 through 3, the engine 14 desirably is a reciprocating multi-cylinder engine operating on a two-cycle, crankcase compression principle. In the illustrated embodiment, the engine 14 has a V-type configuration, and specifically a V-6 cylinder arrangement. The present invention, however, may be applicable to engines having other cylinder numbers and other cylinder arrangements, such as, for example, in-line or slant cylinder arrangements.

A cylinder block assembly 26 lies generally at the center of the engine 14. In the illustrated embodiment, the cylinder block 26 includes a pair of inclined cylinder banks 28. The cylinder banks 28 extend at an angle relative to each other to give the engine 14 a conventional V-type configuration.

Each cylinder bank 28 includes a plurality of parallel cylinder bores. A cylinder liner 30 forms each cylinder bore. The cylinder liner 30 is cast or pressed in place in the cylinder bank 28 in a known manner. As is typical with V-engine arrangements, the cylinder bores 30 of the first cylinder bank 28 are offset slightly in the vertical direction from the cylinder bores 30 of the second cylinder bank 28 so that the connecting rods of adjacent cylinders 30 can be journaled on the same throw of the crankshaft 17, as known in the art.

As understood from FIGS. 1 through 3, each cylinder 30 includes a plurality of scavenge passages formed in the cylinder block 26. In the illustrated embodiment, each cylinder 30 includes a main scavenge passage 32 and a pair of circumferentially disposed side scavenge passages 34. The scavenge passages 32, 34 terminate in respective scavenge ports 36, 38 formed in the cylinder liner 30.

An exhaust port 40 lies diametrically opposite of the main scavenge port 36 and between the side scavenge ports 38. The exhaust port 40 is also formed in the cylinder liner 30. An exhaust passage 42 communicates with the cylinder 30 through the exhaust port 40. The configuration of the ports desirably is designed to provide a Schnurle-type scavenging in the cylinder 30.

With reference to FIG. 1, the exhaust passages 42 associated with the cylinders 30 of each cylinder bank 28 lead away from the respective cylinder 30 and merge into a common exhaust manifold 44. Each exhaust manifold 44 communicates with an exhaust conduit 46 formed in the mounting plate 16. An exhaust pipe 48 communicates with each exhaust conduit 46. Each exhaust pipe 48 depends from the bottom side of the support plate 16 down into the drive shaft housing 18.

The length of the exhaust passages 42 and the combined length of the respective exhaust manifold 44, exhaust conduit 46, and exhaust pipe 48 are desirably tuned to produce reflected expansion waves which return to the exhaust port 40 at the time the respective exhaust port 40 is closing. The reflected expansion waves help scavenge the combustion products (i.e., supercharge), as known in the art.

In the illustrated embodiment, one of the exhaust pipes 48 has a longer length than the other because the respective exhaust manifold 46 has a shorter length. The difference in manifold length is due to the slight vertical offset between the cylinders 30 of one bank 28 and the cylinders 30 of the other bank 28, as described above.

The exhaust pipes 48 form part of the muffler 24 disposed within the drive shaft housing 18. Each exhaust pipe 48 opens into a dedicated expansion chamber 50 which receives exhaust gases from the cylinders 30 of only one of the cylinder banks 28. This arrangement prevents the expansion waves produced in the exhaust system of one cylinder bank 28 from interfering with or canceling out the tuned wave propagation in the exhaust system of the other cylinder bank 28.

In the illustrated embodiment, a central wall 52 bifurcates the muffler 24 to form the expansion chambers 50. The expansion chambers 50 generally have the same size and shape.

Each expansion chamber 50 communicates with a common exhaust discharge conduit 54 formed in the lower unit 20. The exhaust conduit 54 delivers exhaust gases from the muffler 24 to exhaust passages 56 formed in a hub 58 of the propeller 22. In this manner, engine exhaust is discharged to a submerged region of reduced water pressure behind the propeller 24 to facilitate exhaust flow through the muffler 24, the exhaust discharge conduit 54, and the exhaust passages 56, as known in the art.

With reference to FIG. 2, a cylinder head assembly 60 including a cover 62 is affixed to each of the cylinder banks 28 by a plurality of fasteners 64 (e.g., bolts). Each cylinder head assembly 60 includes a plurality of recesses 66. One of the recesses 66 cooperates with each cylinder bores 30 to close an end of the cylinder. The cylinder head assembly 60 and the cylinder block assembly 26 also define a plurality of water jacket passages 68 which encircle the upper end of the cylinder 30.

A piston 70 reciprocates within each cylinder bore 30. The piston 70 includes a recess 72 formed in the head of the piston 70. As understood from FIGS. 2 and 3, the recess 72 has a generally cylindrical bore configuration concentrically positioned about the center of the piston 70. The head of the piston 70 including the recess 70, the cylinder bore 30, and the recess 66 in the cylinder head assembly 62 together define a variable volume chamber which, at minimum volume, defines the combustion chamber.

Spark plugs 73 are mounted in the cylinder head assemblies 60 and are fired by a suitable ignition system (not shown). A spark gap 75 of each spark plug 73 is positioned to lie generally in the corresponding recess 66 of the cylinder head assembly 60.

Each cylinder head assembly 60 also supports a plurality of fuel injectors 74 which correspond to a respective cylinder bore 30. Each fuel injector 74 is positioned at the center of the corresponding cylinder 30 with a spray nozzle 76 positioned at the upper surface of the recess 66 formed in the cylinder head assembly 60. In this position, the fuel injector 74 substantially aligns with the axis of the cylinder bore 30 and injects fuel toward the recess 72 formed in the piston head 70.

The fuel injector 74 receives pressurized fuel from a fuel manifold (not shown). A conventional fuel delivery system supplies fuel to the fuel manifold in a known manner.

Figure 4:
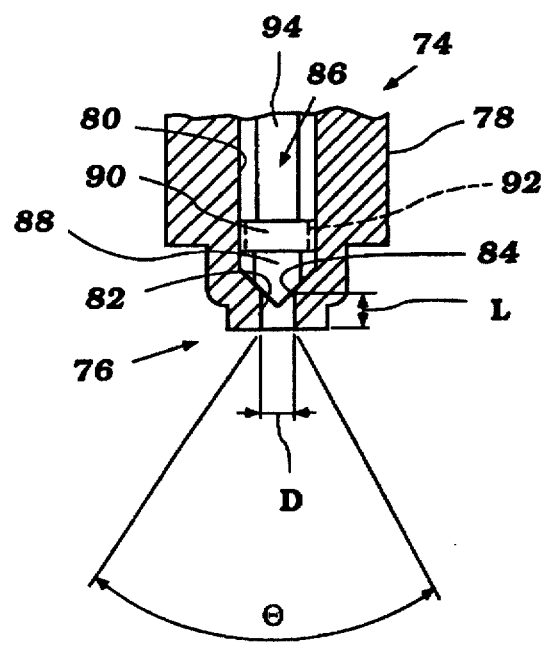
FIG. 4 is an enlarged, partial cross-sectional view of a fuel injector of the cylinder assembly of FIG. 2.

With reference to FIG. 4, each fuel injector 74 includes an injector body 78 which defines a central bore 80. The bore 80 extends along the longitudinal axis of the injector body 78. Fuel is delivered to the interior of the bore 80 through a fuel inlet (not shown) which cooperates with the fuel manifold. The bore 80 opens into a nozzle port 82 of the injector 74. An inclined surface 84 forms a transition from the larger diameter bore 80 to the smaller diameter nozzle port 82, and acts as a valve seat, as described below.

The nozzle port 82 has a diameter D and extends for a length L. The diameter D and the length L are selected so as to provide a spray angle θ which ensures that a large portion (at least 50 percent) of fuel which is injected by the injector 74 at low speed, low load conditions, will impinge upon the recess 72 formed in the piston head 70. The shape ratio L/D of the nozzle port 82 advantageously is small so as to produce a sufficient spray angle θ to produce a spray pattern which substantially covers the recessed portion 72 of the piston 70 before the piston 70 closes the exhaust port 40. FIGS. 2 and 3 schematically illustrate an exemplary spray pattern A with the piston 70 at a position before closing the exhaust port 40. This ensures that maximum fuel can be injected under high speed, high load conditions, while at the same time the fuel particle size at low speed, low load conditions will be relatively small to ensure good fuel vaporization.

An injector valve 86 operates within the bore 80. The injector valve 86 includes a valve head 88 which mates against the valve seat formed by the inclined surface 84 positioned about the inlet to the nozzle port 82. The injector valve 86 also includes a guide 90 which has a diameter substantially matching that of the diameter of the bore 80. The guide 90 ensure proper alignment between the injector valve 86 and the bore 80 of the injector body 78. The guide 90 include a plurality of apertures 92 which extend through the guide 90 in the direction of fuel flow through the injector bore 80. The apertures 92 thus allow fuel flow through the guide 90 and toward the nozzle port 82.

A valve stem 94 extends upwardly from the valve head 88 and cooperates with a solenoid winding (not shown). When energized, the winding draws the injector valve 86 away from the valve seat 84 to open the nozzle port 82. A compression spring (not shown) is compressed through this action. When de-energized, the compression spring forces the valve head 88 against the valve seat 84 to close the nozzle port 82.

As understood from FIG. 2, a connecting rod 96 links the piston 70 to the crankshaft 17 so that reciprocal linear movement of the piston 70 rotates the crankshaft 17 in a known manner. The crankshaft 17 (FIG. 5) desirably is journaled for rotation in a crankcase. The crankshaft 17 includes a plurality of spaced rod journals which lie off axis from the crankshaft axis. An end of one of the connecting rods 96 is coupled to the rod journal so as to link the corresponding piston 70 to the crankshaft 17 in a known manner.

Figure 5:
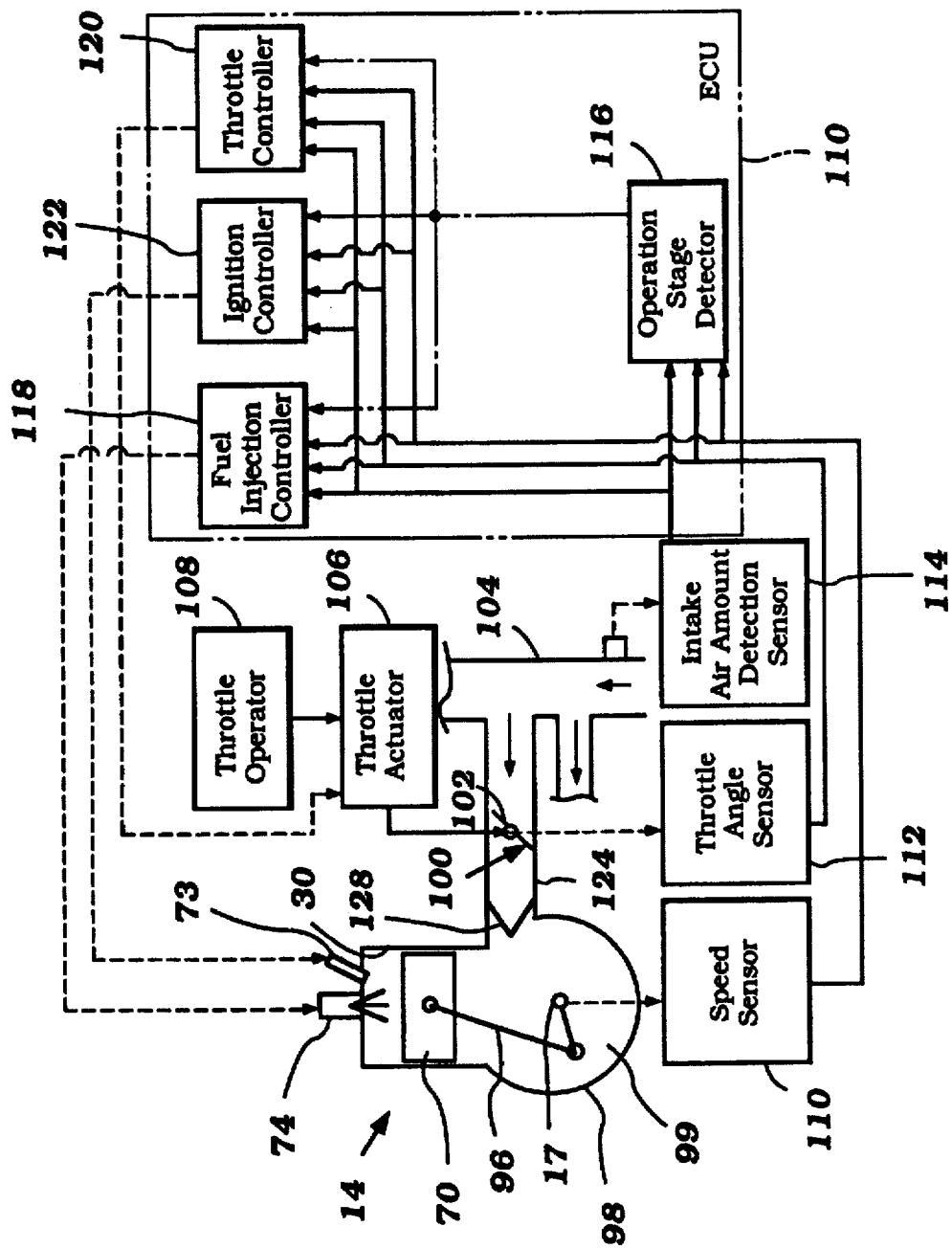
FIG. 5 is a schematic illustration an engine control system shown in reference to one of the cylinder of the engine of FIG. 1.

As seen in FIGS. 2 and 5, a skirt 98 of the cylinder block assembly 26 and a crankcase member (not shown) cooperate to form the crankcase. The crankcase is divided into a plurality of chambers 99, with each chamber communicating with a respective cylinder bore through the corresponding scavenge passages 32, 34. Adjacent crankcase chambers 99 are sealed from each other.

FIG. 5 schematically illustrates an induction system which communicates with each crankcase chamber 99. In the illustrated embodiment, the induction system includes a plurality of throttle devices 100 to control the air flow into the engine 14. The throttle devices 100 desirably correspond in number to the number of crankcase chambers 99. Each throttle device 100 is dedicated to control air flow in a respective crankcase chamber 99.

The throttle devices 100 can, for example, be throttle valve assemblies; however, other conventional throttle devices can be used to regulate air flow into the crankcase chambers 99. Each throttle assembly 100 includes a throttle body which houses a throttle valve 102. A throttle shaft supports the valve 102 within the throttle body.

Each throttle valve body communicates with an intake air manifold or plenum chamber 104 of the induction system. Inlet air flow through the intake manifold 104 and passes through each throttle device 100 when the throttle shaft is rotated to open the throttle valve 102. A throttle linkage (not shown) desirably connects the throttle shafts together so as to uniformly and simultaneously operate and control the throttle valves 102 in a known manner.

As understood from FIG. 5, a throttle actuator 106 actuates the throttle linkage to change the opening degree of the throttle devices 100. The throttle actuator 106 cooperates with a throttle operator 108 as well as an electrical control unit (ECU) 110 of the engine 14 as described below.

The throttle operator 108 in the illustrated embodiment acts as an operator control mechanism to establish a desired operating condition of the engine 14. The throttle operator 108 can be part of a conventional remote control unit positioned at a remote location in the watercraft. The operator 108 can be pivotally moved relative to a housing of the remote control unit. Movement of the operator 108 generally controls the operation of the throttle actuator and establishes a desired operating condition of the engine 14. Movement of the throttle operator 108 in one direction relative to the housing opens the throttle devices 100, and movement in the opposite direction closes the throttle devices 100.

A conventional bowden wire or fly-by wire (not shown) can be used to communicate throttle operator movement to the throttle actuator 106. A lost motion connection (not shown) desirably lies between the throttle operator 108 and the throttle actuator 106 such that movement of the throttle operator 108 within a particular range of movement corresponding to low speed, low load conditions on the engine 14 does not cause the throttle actuator 106 to actuate the throttle linkage.

As seen in FIG. 5, the ECU communicates with a sensory system which detects engine speed as well as intake air flow. In the illustrated embodiment, the sensory system includes a speed sensor 110 which measures engine speed and generates an input signal indicative of the speed. A throttle angle detector sensor 112 detects the opening degree of the throttle device 100 (e.g., the angular orientation of the throttle valve 102) and generates an input signal indicative of the throttle opening degree. An intake air amount detection sensor 114 senses the amount of air flowing through the intake manifold 104. Any of a wide variety of intake air flow sensors can be used, such as, for example, a pivot vane-type sensor or a high wire chronometer. The intake air amount detector sensor 114 generates an input signal which is indicative to the amount of air flow flowing through the intake manifold 104.

The ECU 110 communicates with the sensors 110, 112, 114, and receives input signals from them. As schematically illustrated in FIG. 5, the ECU includes a operation stage detector 112 which receives the input signals from the sensors. The operation stage detector 116 is configured to determine the operational condition of the engine 14 and generates an output signal indicative of the particular operational condition. The operation stage detector 116 also determines if the present operational state of the engine 14 lies below a preselected low speed, low load condition of the engine 14.

A fuel injection controller 118 of the ECU 110 receives the output signal from the operation stage detector 116 as well as the input signals from the sensors. In response to these signals, the fuel injection controller 118 generates an appropriate output signal to control the fuel injection amount and the fuel injection timing of the fuel injectors 74 in the manner described below.

A throttle controller 120 of the ECU 110 also receives the output signal from the operation stage detector 116 as well as the input signals from the sensors. Based on the input information, the throttle controller 120 controls the opening degree of the throttle device 100. The throttle controller 120 produces an output signal which is received by the throttle actuator 106. In an illustrated embodiment, the throttle controller 120 controls the throttle angle, as described below in more detail.

The ECU 110 also includes an ignition controller 122 which likewise receives the output signal from the operation stage detector 116 as well as the input signals from the sensors. The ignition controller 122 controls ignition timing and produces an output signal received by the ignition system which causes the spark plugs 73 to fire in a known manner.

The operation of the present fuel injection system will now be described with principal reference to FIGS. 5–8. Because it is believed that those skilled in the art can readily understand how the invention can be practiced with multiple cylinder engines, the operation of the engine will be described by particular reference to only a single cylinder.

With reference to FIG. 5, intake air flows through the manifold 104 into the throttle body corresponding to the respective cylinder 30. The throttle valve 100 regulates air flow into the crankcase chamber 99 associated with the respective cylinder 30. An intake passage 124 delivers the air to the respective crankcase chamber 99 through a reed-type check valve 128 connected to the intake passage 126. The reed-type check valve 128 permits air flow into the crankcase chamber 99 when the corresponding piston 70 moves toward top dead center (TDC), but precludes reverse flow when the piston 70 moves toward bottom dead center (BDC) to compress the air delivered into the crankcase chamber 99.

Movement of the piston 70 toward bottom dead center (BDC) compresses the air in the respective crankcase chamber 99. The compressed air flows into the variable volume chamber through the plurality of scavenge passages 32, 34 as the piston 70 moves toward the bottom of its stroke. The air enters the chamber through the respective scavenge ports 36, 38. The piston 70 compresses the air within the chamber as it moves toward top dead center. During this period the fuel injector 74 injects a desired amount of fuel to form an air-fuel charge of a specific air-fuel ratio before the piston 70 closes the exhaust port 40, as described below. The charge in the combustion chamber is fired by the spark plug 73 at a desired time during the cycle. The spent charge is then discharged through the exhaust port 40 and passage 42. The exhaust gases then flow through the respective exhaust manifold 44, exhaust pipe 48, and into the corresponding expansion chamber 50 of the muffler 26. The exhaust system then discharges the burned gases in the manner described above.

Figure 6B:
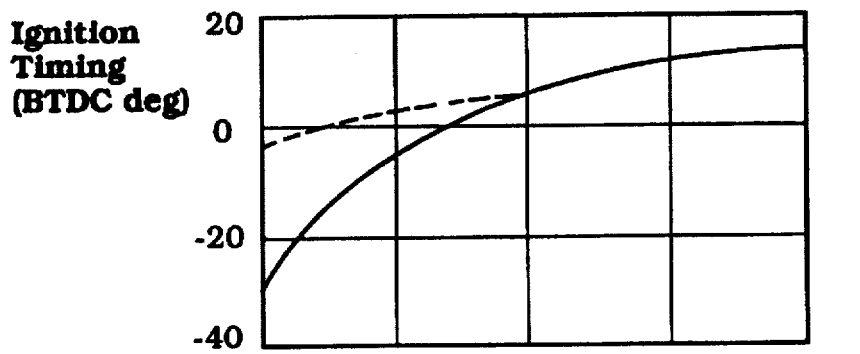
FIG. 6b is a graph of ignition timing versus engine speed.
Figure 6D:
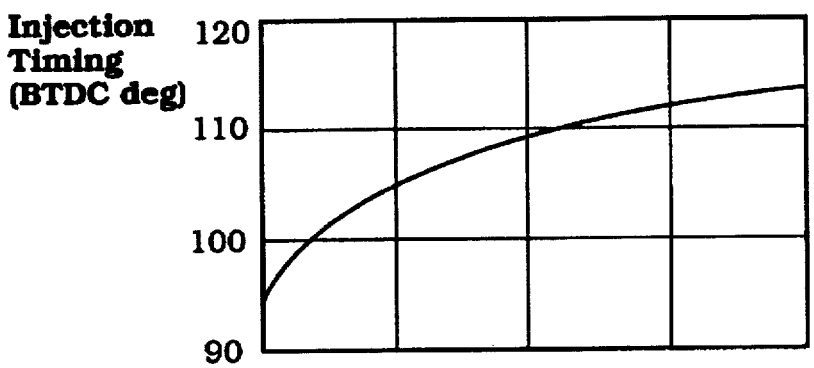
FIG. 6d is a graph of fuel injection initiation timing versus engine speed.
Figure 6C:
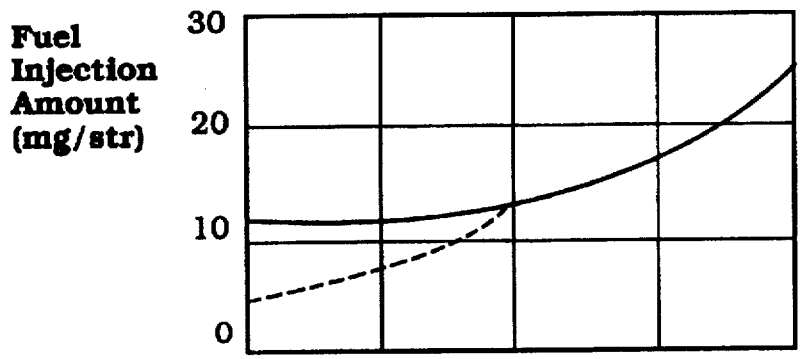
FIG. 6c is a graph of injected fuel amount versus engine speed.
Figure 6A:
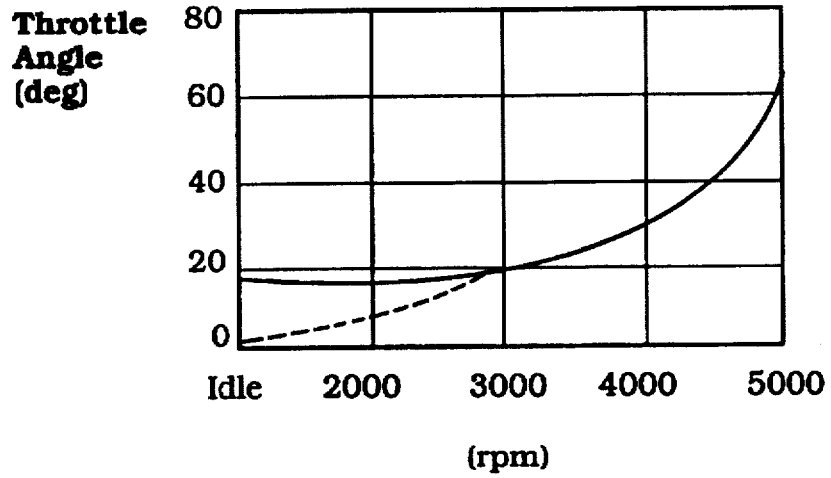
FIG. 6a is a graph of throttle valve angle versus engine speed.

During the above described cycle, the ECU 110 controls the opening degree of the throttle device 100 depending upon the sensed operating condition of the engine 14. That is, the throttle controller 120 of the ECU 110 outputs a signal which instructs the throttle actuator 106 to establish a specific throttle opening (e.g., throttle angle) for a particular engine speed/load condition determined by the operation stage detector 116 of the ECU 110. The throttle opening specified by the throttle controller 120 desirably is in accordance with a preselected throttle opening profile stored in memory in the ECU. FIG. 6a illustrates an exemplary throttle opening profile.

As seen in FIG. 6a, the throttle controller 120 desirably maintains a constant throttle opening degree (i.e., throttle angle) at engine speeds below a predefined engine speed. For instance, as seen in FIG. 6a, the throttle controller 120 maintains a substantially constant throttle opening for engine speed/load conditions below 3,000 rpm. At engine speeds above this predefined limit, the opening degree of the throttle device 100 increases in accordance with the illustrated profile.

FIG. 6a also illustrates that the opening degree of the throttle device 100 is larger than an opening degree where the throttle device is used to control engine speed at low speed/low load operating conditions. The dashed line in FIG. 6a illustrates a conventional profile in which the throttle device is used to control engine speeds under low speed/low load operating conditions. As a result of maintaining a generally constant throttle opening at lower engine speeds, the responsiveness of the engine 12 improves.

Rather than controlling engine speed by adjusting the throttle opening at low speed/low load operating conditions, the present fuel injection system controls the engine speed by retarding the spark timing to a point well after the piston 70 has past top dead center (TDC) and is moving toward the bottom of its stroke. To achieve this, the ignition timing controller 122 of the ECU 110 controls ignition timing in accordance with a preselected ignition timing profile stored in memory in the ECU 110. FIG. 6b illustrates an exemplary ignition timing profile as a function of engine speed.

Figure 8:
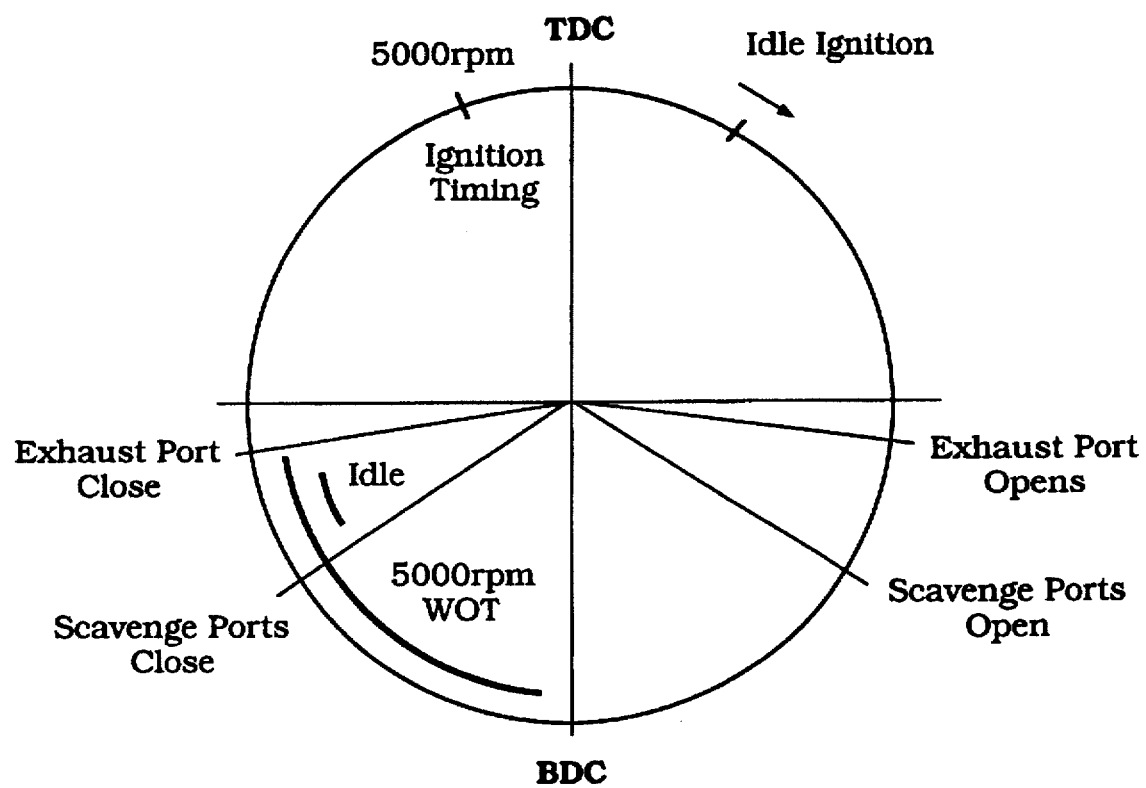
FIG. 8 is a timing diagram showing the operation of the engine under an idle condition and under a wide open throttle condition.

As understood from FIGS. 6b and 8, the ignition timing controller 122 retards spark timing until well after the piston 70 passes top dead center (TDC) when the engine 14 operates under a low speed/low load condition. For instance, at idle, the ignition timing controller 122 retards spark timing until the piston 70 is about 30° past top dead center, i.e., −30° BTDC (before top dead center). The ignition timing controller 122 advances the spark timing as engine speed increases. For instance, the ignition timing controller 122 advances the spark timing to occur slightly before top dead center with the engine running at about 3,000 rpm, and advances the spark timing to occur more than 10° before top dead center with the engine running at about 5,000 rpm. The timing diagram illustrated in FIG. 8 best shows the retardation of spark timing at idle and the advancement of spark timing at 5,000 rpm.

FIG. 6b best illustrates that the degree of spark retardation is significant greater than that done in prior engines. In FIG. 6b, the dotted line represents prior spark timing retardation with the engine operating under a low speed/low load operating condition. The later combustion of the fuel/air charge occurs in the combustion chamber, the less work the produced energy produces. In this manner, the ignition controller 122 can control engine speed under low speed/low load operating conditions by substantially retarding the spark timing without varying the degree of throttle opening.

Similar to throttle operation and spark timing, the ECU 110 controls the amount of fuel injected into the combustion chamber depending upon the sensed operating condition of the engine 14. The fuel injection controller 118 of the ECU 110 outputs a signal which instructs the fuel injector 74 to open for a specific period of time in order to inject a specific amount of fuel for a particular engine speed/load condition. The amount of fuel injected desirably is in accordance with a preselected fuel amount profile stored in memory in the ECU 110. FIG. 6c illustrates and exemplary profile of the amount of fuel injected verses engine speed. Because both the amount of fuel injected and the throttle opening degree depend upon the operating condition of the engine, the profiles of FIG. 6a and 6c establish a desired air-fuel ratio according to known stoichiometric principles.

Importantly, like the throttle opening, the amount of fuel injected under low speed/low load operating conditions remains substantially constant at engine speeds below a predefined engine speed. For instance, as seen in FIG. 6c, the fuel injection controller 118 maintains a substantially constant amount of fuel injected into the combustion chamber for engine speeds below 3,000 rpm. The fuel/air charge produced within the combustion chamber therefore will remain substantially constant as the throttle opening and fuel injection amount are held constant when the engine 14 operates within a range of low speed/low load operating conditions (e.g., at engine speeds below 3,000 rpm).

As a result, a portion of the energy produced through combustion at low engine speeds when the spark timing is retarded, manifests as thermal energy which heats the engine 14. The engine 14 consequently warms-up quicker to a desired operating temperature.

The fuel injection controller 118 also controls fuel injection timing depending upon the sensed operating condition of the engine 14. The timing specified by the fuel injection controller 118 desirably is in accordance with a preselected injection timing profile stored in memory in the ECU 110. FIG. 6d illustrates an exemplary injection timing profile.

Figure 7:
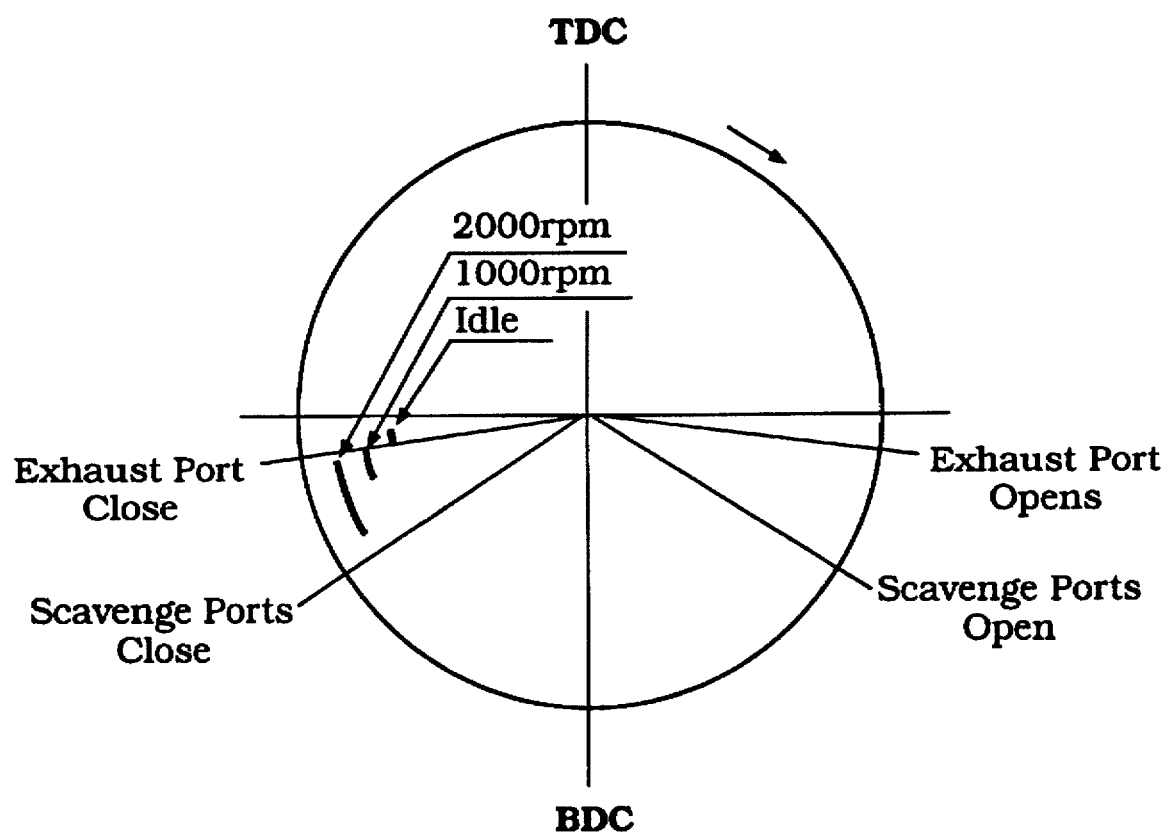
FIG. 7 is a timing diagram showing the operation of the fuel injector for various engine speeds.

As seen in FIGS. 6d and 7, the fuel injection controller 118 advances the timing, of fuel injection initiation as the speed and the load of the engine increases. For instance, the fuel injection controller 118 initiates fuel injection at about 95° before top dead center with the engine idling, and advances the initiation of fuel injection to about 110° before top dead center with the engine running at about 3,000 rpm.

The fuel injection controller 118 also desirably operates the fuel injector 74 to inject the entire fuel amount before the exhaust port 40 closes. For instance, as seen in FIG. 8, the fuel injector 74 completes fuel injection before the exhaust port 40 closes when the engine 14 is idling, as well as when the engine 14 is operating at wide open throttle (e.g., 5,000 rpm).

Completing fuel injection before the exhaust port 40 closes allows time for fuel atomization before ignition. Consequently, fuel-air charge consistence improves. And because the fuel injector 74 injects the fuel directly into the recess 72 on the piston head 70, only minimum fuel is lost into the blow-by portion of the scavenge flow through the exhaust port 40 before the exhaust port closes.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An internal combustion engine comprising an engine speed control operator movable within a range of movement such that the position of said engine control operator corresponds to a desired engine speed, at least one variable volume chamber defined by first and second components which move relative to each other, a throttle device communicating with said chamber to regulate intake air flow into said chamber, a throttle actuator arranged to vary the opening degree of said throttle device, said throttle actuator cooperating with said engine control operator, a fuel injector mounted in said first component and arranged to deliver fuel directly into said chamber to form a fuel-air charge, an igniter positioned within said chamber to ignite the fuel-air charge, a speed sensor to detect the speed of said engine, an intake air sensor to detect the amount of intake air flow into said chamber, a operator position sensor to detect the position of said engine control operator, and a controller communicating with said speed sensor, said air intake sensor and said operator position sensor, and being responsive to input signals from said sensors to ascertain the operating condition of said engine and to determine if the operating condition is below a preselected operating condition, said controller further configured to control said throttle actuator to maintain a substantially constant opening degree with the engine operating below said preselected operating condition, to control the fuel injector to maintain a substantially constant amount of fuel injected into said chamber with said engine operating below said preselected operating condition, and to adjust igniting timing of said igniter to provide engine speed corresponding to the position of said engine control operator.

2. An internal combustion engine as in claim 1, wherein engine operating conditions below said preselected operating condition correspond to a range of low engine speed/low load conditions.

3. An internal combustion engine as in claim 2, wherein said range of low engine speed/low load conditions is from idle to about 3,000 rpm.

4. An internal combustion engine as in claim 1, wherein said second component is formed with a recess area, and said fuel injector is arranged to inject fuel toward said recess portion.

5. An internal combustion engine as in claim 4 additionally comprising at least one exhaust port communicating with said chamber, said second components opening and closing said exhaust port with repetitive movement relative to said first component, and said controller configured to control said fuel injector to complete fuel injection before said exhaust port closes.

6. An internal combustion engine as in claim 5, wherein said fuel injector comprises a spray port having a length L and a diameter D selected to give said spray port a size ratio of L/D which produces a spray angle θ to spray over the recess area before said second component closes said exhaust port.

7. An internal combustion engine comprising at least one variable volume chamber defined by first and second components which move relative to each other, at least one exhaust port communicating with said chamber, said second component opening and closing said exhaust port with repetitive movement relative to said first component, a fuel injector mounted in said first component and arranged to spray fuel into said chamber toward said second component, a sensory system to detect at least engine speed, and a controller communicating with said sensory system and being responsive to at least one input signal from said sensor system to determine the operational condition of said engine and to control the fuel injector to complete fuel injection before said exhaust port closes.

8. An internal combustion engine as in claim 7, wherein the sensory system includes a sensor to detect air intake amounts into said chamber, and the controller is configured to determine if the determined operational condition is within a preselected range of low speed/low load operating conditions, and to control the opening degree of a throttle device communicating with said chamber to maintain a substantially constant opening degree with said engine operating within said range of low speed/low load operating conditions.

9. An internal combustion engine as in claim 8 additionally comprising an igniter positioned within said chamber to ignite a fuel-air charge within said chamber, said controller being configured to retard ignition until after a minimum volume condition in said chamber has occurred when said controller determines that said engine is operating within said range of low speed/low load operating conditions.

10. An internal combustion engine as in claim 8, wherein said range of low engine speed/low load conditions is from idle to about 3,000 rpm.

11. An internal combustion engine as in claim 8, wherein the controller further is configured to control the fuel injector to maintain a substantially constant amount of fuel injected into said chamber to meet a preselected fuel-air ratio with the engine condition operating within a range of low speed/low load operating conditions.

12. An internal combustion engine comprising at least one variable volume chamber defined by first and second components which move relative to each other, at least one exhaust port communicating with said chamber, said second component opening and closing said exhaust port with repetitive movement relative to said first component, a fuel injector mounted in said first component and arranged to spray fuel into said chamber toward said second component, a sensory system to detect engine speed and air intake amount into said chamber, and a controller communicating with said sensory system and being responsive to at least one input signal from said sensory system to determine the operational condition of said engine, said controller configured to determine if the determined operational condition is within a preselected range of low speed/low load operating conditions and to control the fuel injector to maintain a substantially constant amount of fuel injected into said chamber to meet a preselected fuel-air ratio with the engine operating within said range of low speed/low load operating conditions, said controller further being configured to control said fuel injector to complete fuel injection before said exhaust port closes.

13. An internal combustion engine as in claim 12, wherein said second component is formed with a recess area, and said fuel injector is arranged to inject fuel toward said recess portion.

14. An internal combustion engine as in claim 13, wherein said fuel injector comprises a spray port having a length L and a diameter D selected to give said spray port a size ratio of L/D which produces a spray angle θ to spray over the recess area before said second component closes said exhaust port.

15. An internal combustion engine comprising at least one variable volume chamber defined by first and second components which move relative to each other, a fuel injector mounted in said first component and arranged to spray fuel into said chamber toward said second component, a throttle actuator actuating a throttle device which communicates with said chamber, said throttle actuator varying an opening degree of said throttle in a manner generally corresponding to a operational position of a throttle operator, means for sensing low speed/low load operational condition of said engine, means for maintaining a constant opening degree of said throttle device with said engine operating under a low speed/low load operational condition, means for maintaining a generally constant fuel amount injected by said fuel injector to produce a preselected fuel-air ratio, and means for controlling ignition timing so as to provide engine speed corresponding to the operational position of said throttle operator.

16. An internal combustion engine as in claim 15, wherein said means for controlling ignition timing is configured to retard ignition until after a minimum volume condition in said chamber has occurred with said engine operating under a low speed/low load operational condition.

17. An internal combustion engine as in claim 15, wherein said means for sensing low engine speed/low load condition on said engine senses engine rotation and air intake amount into said chamber.

18. A method for operating an internal combustion engine comprising at least one variable volume chamber defined by first and second components which move relative to each other, a throttle device communicating with said chamber, a throttle actuator being arranged to vary the opening degree of said throttle device and cooperating with a throttle operator, a fuel injector mounted in said first component and arranged to deliver fuel directly into said chamber to form a fuel-air charge, an igniter positioned within said chamber to ignite the fuel-air charge, said method comprising the steps of sensing the operational condition of said engine and determining if the sensed operation conditions is within a preselected range of low engine speed/low load operational conditions, maintaining a substantially constant opening degree of said throttle device while said sensed operational condition is within said preselected range, maintaining a substantially constant amount of fuel injected by said injector into said chamber to produce a fuel-air charge which meets a preselected air-fuel ratio while said sensed operational condition of said engine is within said preselected range, and timing the ignition of said charge to provide engine speed corresponding to the operational position of the throttle operator.

* * * * *